United States Patent [19]

Doyle

[11] Patent Number: 4,544,272

[45] Date of Patent: Oct. 1, 1985

[54] ALIGNMENT APPARATUS AND METHOD FOR INTERFEROMETER SPECTROMETERS

[75] Inventor: Walter M. Doyle, Laguna Beach, Calif.

[73] Assignee: Laser Precision Corporation, Utica, N.Y.

[21] Appl. No.: 472,013

[22] Filed: Mar. 4, 1983

[51] Int. Cl.⁴ .............................................. G01B 9/02
[52] U.S. Cl. ................................................... 356/346
[58] Field of Search ......................................... 356/346

[56] References Cited

U.S. PATENT DOCUMENTS 3,936,193 2/1976 Auth .................................. 356/346

Primary Examiner—Davis L. Willis
Assistant Examiner—Matthew W. Koren
Attorney, Agent, or Firm—Thomas J. Plante

[57] ABSTRACT

An interferometer spectrometer aligning apparatus and method are disclosed, in which the laser beam generator, which is in the instrument to provide data controlling clock signals, is also used to accomplish initial (and as needed) alignment of the instrument. The laser beam is directed through a target both on its way from the laser generator to the interferometer, and as it is reflected back from the interferometer, thereby validating the perpendicularity of the reflector to the axis of the interferometer. A semi-transparent mirror, i.e., a small beamsplitter, is used in the path of the laser beam ahead of the interferometer beamsplitter, thereby enabling portions of the laser beam to go into both the interferometer and the sample chamber. A second semi-transparent small mirror (beamsplitter) is also used in the path of the laser beam, for the purpose of providing two parallel laser beams both in the interferometer and in the sample chamber, the parallel beams being used for a plurality of optical checking and adjusting tasks.

20 Claims, 5 Drawing Figures

ALIGNMENT APPARATUS AND METHOD FOR INTERFEROMETER SPECTROMETERS

BACKGROUND OF THE INVENTION

The present invention relates to spectrometers which incorporate interferometers, and particularly to improved apparatus and methods for adjusting the optical elements to produce the desired alignment of the radiation beams, particularly the analytical beam.

Spectrometers of the type under discussion, which incorporate Michelson interferometers, have a fixed-length arm and a variable-length arm which is varied to cause spectral scanning. They generally incorporate three separate beams, each of which is affected by the scanning motion of the reflector in the variable-length arm. An analytical beam, which preferably consists of infrared radiation, is a relatively large beam, which is focused on the sample, in the sample region, to provide repetitious interferograms which are integrated and converted electronically to the desired read-out data. A clock beam, which is preferably a monochromatic (laser) beam, is used to determine the points at which readings are taken during each scanning motion. A reference beam, which is preferably a wide band (white light, and possibly infrared) beam provides interferograms which are used as the synchronizing means for starting each analytical scan at the same point, while offsetting the peak of the analytical scan from the peak of the reference scan (which is the convenient scan-initiating point).

Proper alignment of a Michelson interferometer requires that several alignment conditions be met:

(a) The mirrors which define the two arms of the interferometer must be properly aligned with respect to the beamsplitter so as to superimpose the two reflected beams and produce a coherent interferogram.

(b) The analytical beam should be perpendicular to the scanning mirror so as to avoid wavefront shear (and hence loss of coherence) during scanning. In the case of non-perpendicularity, the curved wavefronts will become non-parallel as the interferometer is scanned away from the equal-path-length condition.

(c) The laser clock beam should be perpendicular to the scanning mirror so as to insure a continuous clock signal throughout the scanning range.

(d) The clock beam and the analytical beam should be parallel to one another so as to provide a frequency scale which is accurate and reliable from instrument to instrument, or after realignment of a given instrument.

The present invention is concerned primarily with the use of the laser beam, already included in the system, as the means for providing an additional significant function, i.e., the convenient adjustment of the optical elements for alignment purposes. Laser beams have been used for optical alignment purposes, but usually by bringing a laser device temporarily into the system for alignment only. Or, in some instances, alignment has been accomplished solely by adjusting the optical element to provide the most satisfactory interferometer output.

Previous alignment strategies have been deficient in at least two respects. They have been undesirably time-consuming, and they have failed to insure the highest degree of accuracy in their results.

SUMMARY OF THE INVENTION

The present invention provides an easier and more accurate alignment technique for interferometer spectrometers, using a number of unique concepts which will be claimed both individually and collectively:

1. Using the laser, which is in the instrument to provide clock signals, as the source of radiation for the alignment process;
2. Directing the laser radiation through a target both on its way from the laser generator to the interferometer, and as it is reflected back from the interferometer, thereby validating the perpendicularity of each reflector to the laser beam;
3. Using a semi-transparent mirror, i.e., a small beamsplitter, in the path of the laser beam ahead of the interferometer beamsplitter, thereby enabling portions of the laser beam to go into both the interferometer and the sample chamber; and
4. Using a second semi-transparent mirror (beamsplitter) in the path of the laser beam, for the purpose of providing two parallel laser beams which: (a) permit efficient checking of the optical elements in the sample chamber; (b) permit the use of an aperture in the sample region to select, for use as the analytical beam, that portion of the analytical signal which is parallel to the laser beam in the interferometer; (c) provide tracking means for installing accessories and samples in the sample chamber; and (d) make available a separate laser beam for each of the side-by-side mirrors in those systems where two mirrors, offset in position from one another, are used to reflect the analytical and synchronizing (reference) beams, as disclosed in Doyle Application Ser. No. 470,937, filed Mar. 1, 1983.

DETAILED DESCRIPTION OF SPECIFIC EMBODIMENTS

Figure 1:
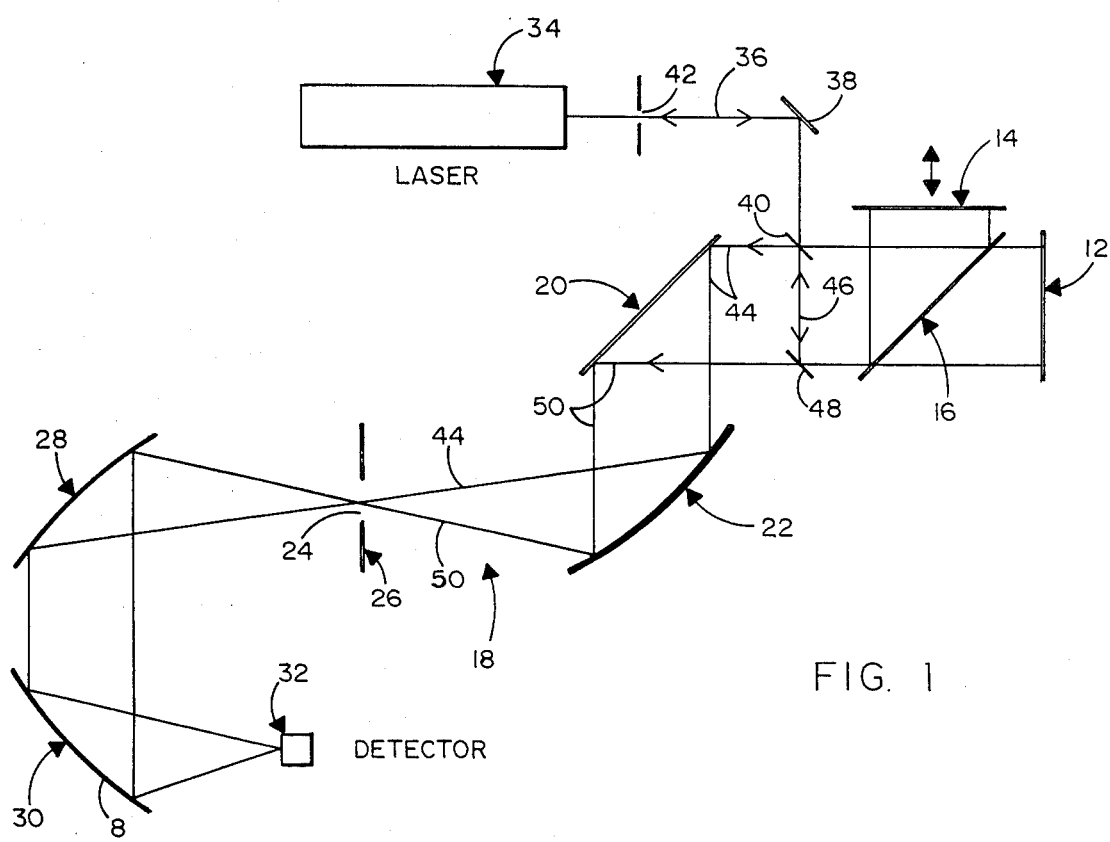
FIG. 1 shows diagramatically the application of the present invention to the interferometer and sample chamber portions of a spectrometer, the arms of the interferometer being defined by two flat mirrors and a beamsplitter.

In FIG. 1, it is assumed that the interferometer comprises a stationary flat mirror 12, a movable flat mirror 14, and a beamsplitter 16 which reflects part of the infrared (analytical) radiation from a source (not shown) toward stationary mirror 12, and transmits part toward movable mirror 14. The two analytical beams in the interferometer arms, after reflection from the mirrors 12 and 14, are recombined at the beamsplitter, and directed toward a sample chamber 18. A flat mirror 20, directs the collimated analytical beam from the interferometer toward a paraboloid reflector 22, which causes the analytical beam to focus at the aperture 24 of a sample holder 26. After illuminating the sample at 24, the analytical beam is caused by suitable optical elements, such as paraboloid reflectors 28 and 30, to focus at detector 32, which receives the optical output of the interferometer, and converts it into electronic spectrometric data.

A laser generator 34 is a permanent part of the system because its beam, which also passes through beamsplitter 16, is used to generate clock signals during scanning by the interferometer. These clock signals cause discrete samplings of data from detector 32 to be integrated into the spectrometric data output.

The present invention is designed to use the clock-providing laser beam (generally helium neon) as the means for initially aligning and adjusting the optical elements in the interferometer.

To begin with, a directional reference needs to be selected for the system, on which the alignment process can be based. Any one of several functioning parts of the interferometer can be selected as the initial directional reference to which the others are adjusted, e.g., either of the arm-ending reflectors, the beamsplitter, or the laser beam itself. Usually, the desired direction of an axis of the interferometer is selected; and one of the arm-defining mirrors is set perpendicular to that axis. Assume that the movable mirror 14 is so set by carefully mounting it in proper alignment on the supporting platform. Then the mirror 14 may be considered the reference surface for alignment of the other arm of the interferometer.

Positioning of the beamsplitter 16 will also rely in most cases on the basic manufacturing tolerances of the equipment. It will be set at its predetermined mounting position at an angle of 45 degrees to the axes of the interferometer arms (which in FIG. 1 are at right angles to one another). The surfaces both of the beamsplitter substrate (on which the semi-transparent coating is applied), and of the equal thickness compensating plate on the other side of the coating, should be parallel, in order to avoid deflection of the beams.

In using the laser beam 36, which emanates from laser generator 34, to align the interferometer, it is important to insure that the laser beam is perpendicular to the reference mirror 14. Beam 36 is shown reflected off a first 45 degree mirror 38, and off a second 45 degree mirror 40, causing it to enter the interferometer and strike beamsplitter 16. The reflected portion of the laser beam is reflected back by mirror 14, and is caused to retrace its path by reflection at mirrors 40 and 38. If the laser beam is perpendicular to mirror 14, it will retrace its path exactly, and pass through a target aperture 42, which it previously passed through on its way from laser generator 34. The exact position of target aperture 42 is not crucial, but it must be so located that perpendicularity of the laser beam to mirror 14 is demonstrated by its hitting the target after it returns from the interferometer.

In order to permit the direction of laser beam 36 to be adjusted until it is perpendicular to mirror 14, the position of mirror 40 is adjustable. If initially the returning laser beam does not hit the target, the position of mirror 40 is adjusted until the returning laser beam does hit the target.

The next step is to insure that the portion of the laser beam which is reflected by beamsplitter 16 toward stationary mirror 12 is perpendicular to that mirror. If it is, the axes of both interferometer arms will be perpendicular to their reflectors, and, in the design of FIG. 1, the surfaces of mirrors 12 and 14 will be perpendicular to one another. The necessary adjusting to cause the laser beam to retrace its path after reflection from mirror 12, thereby establishing its perpendicularity to the mirror, is accomplished by adjusting the position of mirror 12. This is generally made possible by mounting mirror 12 so that it can be moved for adjustment purposes both around a horizontal axis and around a vertical axis.

When the position of mirror 12 has been adjusted so that the returning laser beam hits aperture target 42, the interferometer is in basic alignment. And an important function has thus been accomplished conveniently and without any need for using elements extraneous to the interferometer spectrometer system. Preferably, a final adjusting step is accomplished by monitoring the analytical interferogram.

Significant additional benefits can be provided by refinements of the simple structure described thus far.

It is highly useful that mirror 40 be a semi-transparent mirror, i.e., a small beamsplitter. This allows a portion of the laser beam returning from the interferometer to be transmitted through beamsplitter 40 as a beam 44, which enters the sample region 18 in a direction parallel to that of the collimated analytical beam. (Their parallelism is assured by the adjustments previously made, provided the two surfaces of small beamsplitter 40 are parallel to one another.)

Because beam 44 is reflected by the optical elements 20 and 22 toward aperture 24 in the sample holder 26, this laser beam 44 can be used to check the positioning of the paraboloid reflector 22. In other words, in order for the beam 44 to pass through aperture 24, the focal point of paraboloid reflector 22 must coincide with aperture 24. So the laser beam is useful in checking and adjusting the sample region optics, including reflectors 28 and 30 which direct radiation to detector 32. In setting up a functioning apparatus, it would be the normal practice to have the sample region pre-aligned so that the focal point of the paraboloid 22 would coincide with the aperture 24. Then alignment of the apparatus could be accomplished by adjusting the position of flat mirror 20 rather than paraboloid 22. As will be explained below, the inclusion of a second laser beam parallel to laser beam 44 provides a final check on the optical system in the sample chamber.

An important advantage of having the laser beam 44 pass through aperture 24 is that this automatically selects for detection that portion of the analytical beam which is parallel to the laser beam in the interferometer. This parallelism of the clock (laser) and analytical beams gives the benefit of reproducible frequency scale in the signal sampling that occurs during scanning.

There is a still further refinement of the invention which provides additional significant benefits. The small beamsplitter 40 transmits a portion of the incoming laser beam 36 as a beam 46, which is available for use as a second laser beam in the sample chamber. Beam 46 is partially reflected by a semi-transparent mirror 48, i.e., an additional small beamsplitter. The portion of beam 46 reflected by small beamsplitter 48 is directed toward beamsplitter 16, which again splits it, directing the transmitted portion toward stationary mirror 12, and the reflected portion toward movable mirror 14. After reflection from the respective interferometer arms, laser beam 46 returns to small beamsplitter 48, and is partially transmitted as beam 50 into sample chamber 18. It is directed through aperture 24, the focal point of paraboloid mirror 22, and subsequently is reflected by mirrors 28 and 30 toward detector 32.

The position of the second small beamsplitter 48 needs to be adjustable, so that it may initially be adjusted until the portion of laser beam 46 reflected by beamsplitter 48 retraces its incoming direction and hits the target aperture 42. This adjustment insures that laser beam 46 in the interferometer is perpendicular to mirrors 12 and 14, and is therefore parallel to laser beam 36 (provided the two surfaces of small beamsplitter 48 are parallel to one another). The two laser beams 44 and 50 leaving the interferometer are parallel, and therefore meet at the focal point of paraboloid reflector 22, i.e., at aperture 24.

By locating the second small beamsplitter 48 on the opposite side of the interferometer axis from the first small beamsplitter 40, and by having them equi-distant from the axis, the result is that the two laser beams 44 and 50 essentially define the outer boundaries of the collimated analytical beam. In order for this dual laser beam arrangement to have proper alignment, the two laser beams 44 and 50 must intersect at aperture 24. This, in effect, forces the analytical beam (which is being effectively used) to be parallel to the laser beams in the collimated part of the system, including the interferometer. This is true because the aperture 24 serves to define the available viewing angle into the interferometer.

This insured parallelism of the laser and analytical beams has two very important benefits: (1) It insures that spectra from different instruments, or from the same instrument after realignment, will have consistent clocking, thereby providing accurate calibration of the spectral frequency scale of the instrument; and (2) Because the laser has been set perpendicular to the mirrors in the interferometer arms, the parallelism of the analytical and laser beams insures that the analytical beam is perpendicular to those mirrors, thereby avoiding scanning-induced optical aberrations which would degrade coherence and hence degrade the spectral signal level and resolution.

Although only one laser beam is necessary if the aperture 24 and detector 32 are both known to be accurately positioned in the focal planes of their respective optics, the use of two laser beams has several advantages: (1) they provide a convenient means for checking the focal length of paraboloid reflector 22 and the position of aperture 24, without obscuring the analytical beam; (2) they provide a convenient tracking means for use in installing accessories and samples of various types in the sample chamber 18; and (3) they make it possible to direct separate laser beams to the two mirrors of a "split" reflector defining one interferometer arm in a structure of the type shown in FIGS. 1-3, 6, and 7 of Doyle Application Ser. No. 470,937. Advantage "1" has already been discussed. Advantage "3" will be discussed below with reference to FIG. 5.

Advantage "2" is available because the analytical beam is essentially "outlined" by the laser beams. As various accessories are substituted in the sample chamber, each installation of such an accessory requires a careful alignment process. For example, if a micro-sampling accessory is installed, it will have two or three mirrors that redirect the analytical beam and condense it into a very small spot. Because of the plurality of mirrors, adjustment of the accessory is quite complicated. And the dual laser beams provide a visible means for assuring that the accessory is adjusted properly. The use of two laser beams provides all the necessary information, whereas the use of only one would indicate the direction but would not show whether or not the optics are out of focus.

Figure 2:
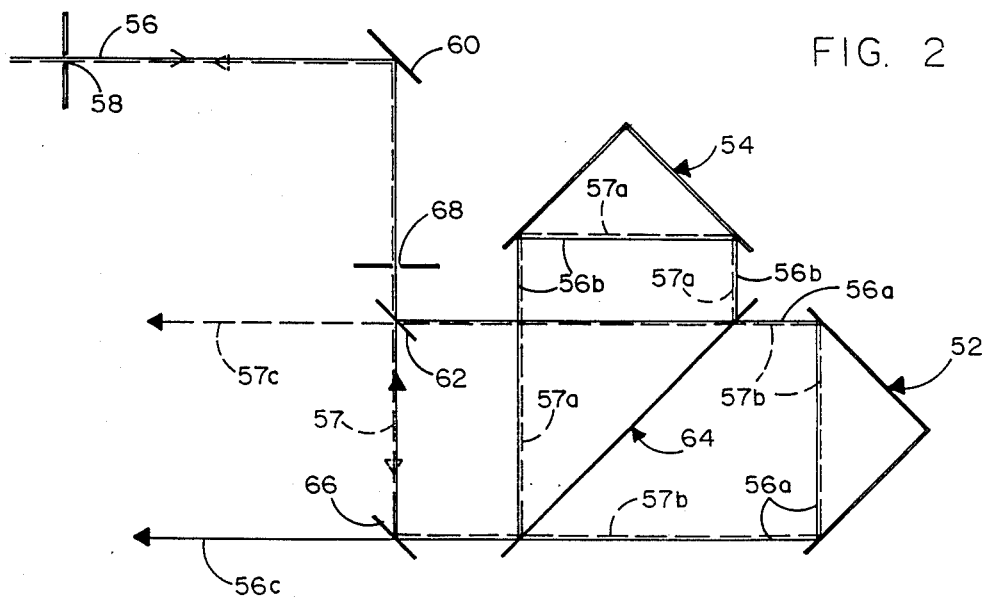
FIGS. 2 and 3 show diagramatically the application of the present invention to two additional types of interferometer structure.

FIG. 2 shows the use of the laser clock beam for alignment purposes in an interferometer spectrometer having retroreflectors, rather than flat mirrors, defining the interferometer arms. Retroreflectors 52 and 54 are used instead of the flat mirrors of FIG. 1. One of the retroreflectors is stationary and the other is movable to cause scanning. Certain requirements of the system of FIG. 1 do not apply to the system of FIG. 2. In the latter the laser and analytical beams are not perpendicular to the reflector surfaces, and the laser beams do not retrace their entering path as they leave the interferometer. As before, the entering laser beam 56 (shown by the solid line) passes through a pin hole target aperture 58, and is reflected by a 45 degree mirror 60, and by another 45 degree mirror 62, causing it to enter the interferometer at one side of the space provided for the analytical beam. A beamsplitter 64 transmits a portion of the laser beam 56, the path of which is designated 56a. This portion 56a is reflected twice by the retroreflector 52, first across the retroreflector, and then along a path at the other side of the analytical beam parallel to the entering path and back toward beamsplitter 64. A 45 degree mirror 66 causes the portion of the returning laser beam which is transmitted by beamsplitter 64 to be reflected back toward mirror 62.

Both mirror 62 and mirror 66 are semi-transparent mirrors, or small beamsplitters, as in the system of FIG. 1.

A first alignment step in FIG. 2 is the adjustment of mirrors 62 and 66 until the entering and returning laser beams are colinear. This is determined by their passing through a pair of target apertures, a pin hole target aperture 68 located between mirrors 62 and 60, and aperture 58 located between mirror 60 and the laser source.

In FIG. 2, the portion of the laser beam represented by the solid line is shown being transmitted through small beamsplitter 66 toward the sample chamber along line 56c. A solid line 56b shows the path of the portion of the entering laser beam which is reflected by beamsplitter 64 toward retroreflector 54, then across the retroreflector and back toward beamsplitter 64 along the other side of the collimated analytical beam.

The dashed line 57, which is, in fact, colinear with the solid line 56, indicates the portion of the laser beam which is transmitted by small beamsplitter 62. This dashed line beam passes through the interferometer in the opposite direction from the solid line beam and enters the sample chamber at the side of the collimated analytical beam opposite the solid line beam. The dashed line beam is partially reflected by small beamsplitter 66 toward primary beamsplitter 64, which partially reflects it along line 57a toward retroreflector 54, and partially transmits it along line 57b toward retroreflector 52. The beams 57a and 57b are reflected across their respective retroreflectors, and then each back toward beamsplitter 64 along a path parallel to its entering path, but at the other side of the analytical beam. After paths 57a and 57b are rejoined at beamsplitter 64, the dashed line beam returns to small beamsplitter 62, which partially transmits it toward the sample chamber along line 57c, and partially reflects it toward target apertures 68 and 58.

This dual laser alignment beam arrangement has the advantages previously discussed in connection with FIG. 1.

In the system of FIG. 2, the shear avoidance requirement is different from that of FIG. 1. In the FIG. 2 system, it is necessary that the laser and analytical beams be parallel to the direction of motion of the moving retroreflector. This can be accomplished by adjusting the beam direction, i.e., by adjusting semi-transparent mirrors 62 and 66 so that proper retracing of the laser beam occurs at both extremes of scanning travel of the retroreflector. The simplest way to make this adjustment is first to project the first reflected laser beam on a target, and adjust mirror 62 so that no motion of this laser beam takes place during scanning. Then mirror 66 is adjusted, and final adjustment is made, in the manner discussed in the description of FIG. 1.

Figure 3:
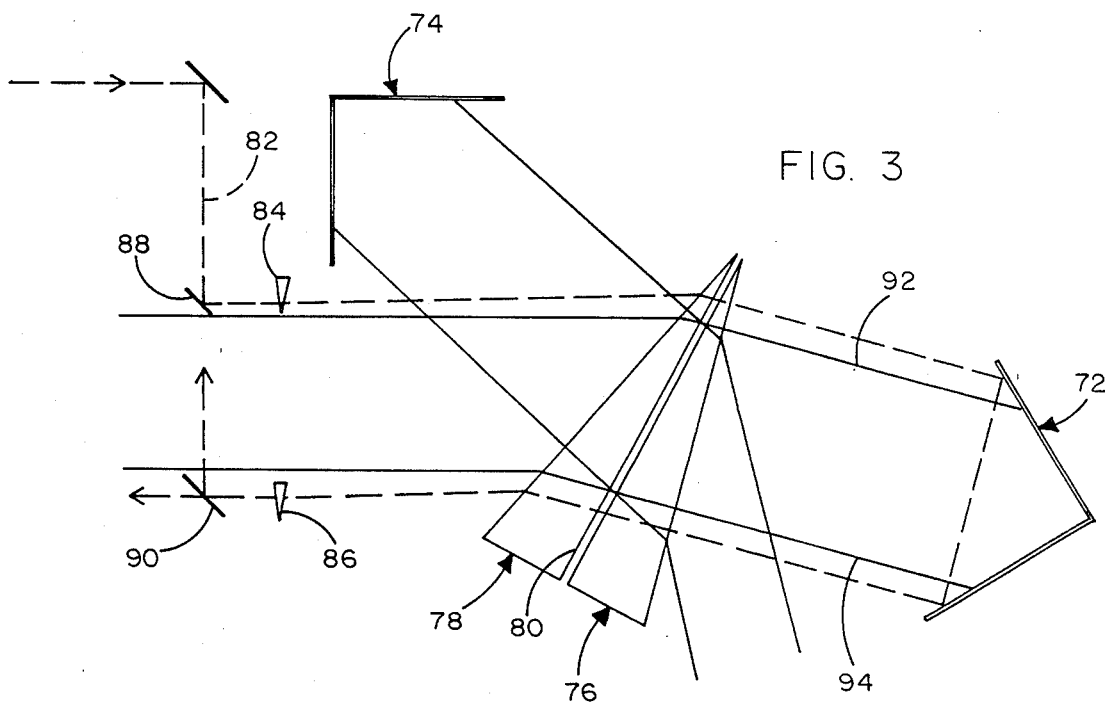

FIG. 3 shows the application of the invention to a refractively scanned interferometer, of the type disclosed in Doyle Pat. Nos. 4,165,938, 4,190,366, and 4,265,540. Stationary retroreflectors 72 and 74 are used to define the arms of the interferometer. Scanning is accomplished by moving a wedge-shaped prism 76 across the path of the analytical beam. A stationary wedge-shaped prism 78, having a beamsplitter coating 80, is so shaped as to provide a compensating effect to avoid optical aberrations.

In the system of FIG. 3, the laser clock beam, which is indicated by dashed line 82, will have a deflection different from that of the analytical beam, since the refractive index of the beamsplitter and the scanning wedge varies somewhat with wavelength. This problem can be solved by including small correcting prisms 84 and 86 in the paths of the entering and returning laser beams, respectively. The index of refraction and prism angle of each of the prisms 84 and 86 is chosen to provide the proper correction.

As in the previous figures, two small beamsplitters 88 and 90 are provided in the path of the laser beam. The solid lines 92 and 94 show the limits of the collimated analytical beam.

Figure 4:
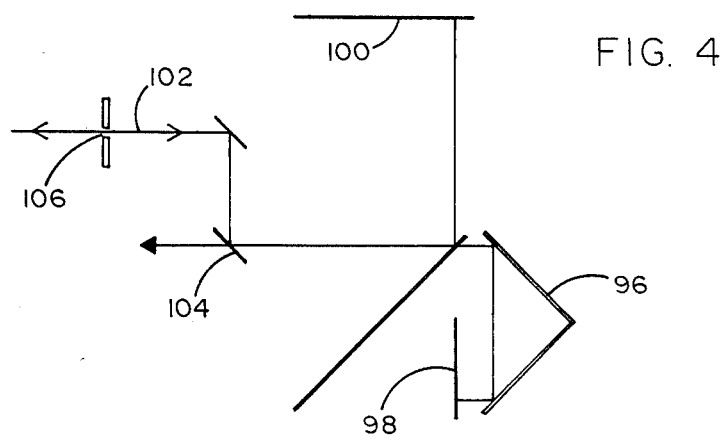
FIG. 4 shows diagramatically the application of the present invention to a spectrometer in which the interferometer structure is similar to the preferred embodiment of Doyle Application Ser. No. 470,937.

FIG. 4 shows diagramatically the use of the laser clock beam as the alignment instrumentality in an interferometer spectrometer of the type shown in FIGS. 6 and 7 of Doyle Application Ser. No. 470,937, and in FIG. 1 of Doyle Application Ser. No. 470,936. A moving retroreflector 96 is combined with a stationary "folding" mirror 98 in the variable-length arm of the interferometer, for the reasons discussed in those applications. The other, fixed-length arm of the interferometer is defined by a stationary, but initiallyadjustable, flat mirror (or mirrors) 100.

In this arrangement, the reference surface, for alignment purposes, is the stationary folding mirror 98. The laser beam 102 is reflected into the interferometer by a semi-transparent mirror, or small beamsplitter, 104. In aligning the interferometer, first the position of semi-transparent mirror 104 is adjusted until the laser beam returning from retroreflector 96 retraces its path to hit a target aperture 106. Then the position of stationary reflector 100 is adjusted until the laser beam returning from it also retraces and hits aperture 106. The second small laser beamsplitter is not illustrated in this figure.

Figure 5:
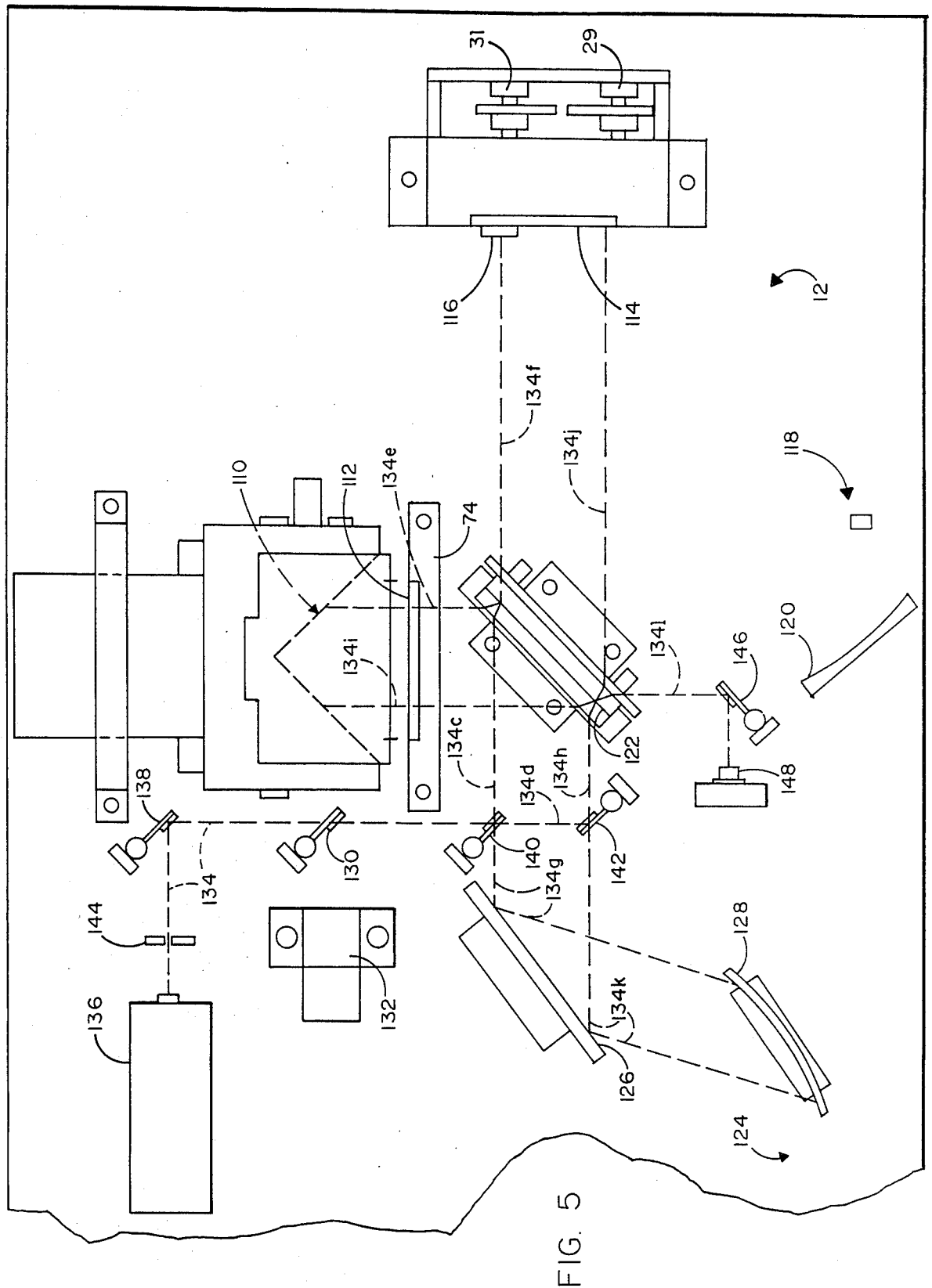
FIG. 5 is a plan view of an experimental physical embodiment of the spectrometer system shown diagramatically in FIG. 4.

FIG. 5, which is similar to FIG. 1 of Doyle Application Ser. No. 470,936, shows a plan view of an experimental physical embodiment of an interferometer spectrometer structure incorporating a moving retroreflector and folding mirror in one arm, and two flat stationary mirrors in the other arm, one of which reflects the analytical beam, and the other of which reflects the white light reference beam which synchronizes the starting points of successive analytical interferograms. The present description of this structure will concentrate on the laser beam alignment technique, since reference can be made to Doyle Applications Ser. No. 470,936 and 470,937 for additional details.

A moving retroreflector 110, combined with a stationary folding mirror 112, define the variable-length interferometer arm. The fixed-length arm is defined, for the analytical (infrared) beam, by a flat stationary mirror 114. The reference or synchronizing (white light) beam is reflected in the fixed-length arm by a relatively small flat stationary mirror 116. Because the analytical and reference beams in the fixed-length arm travel slightly different distances, due to the axial spacing between the reflecting surfaces of mirrors 114 and 116, the interferograms of the reference and analytical beams are offset from one another. This permits the peak of each reference interferogram to be used as the starting point for the scan which produces each analytical interferogram.

The light source for both the analytical beam and the reference beam is at 118. Both beams are reflected by a paraboloid 120 toward the primary beamsplitter 122. The transmitted portion is reflected by retroreflector 110 toward the folding mirror 112, then back to the retroreflector and back to the beamsplitter 122. The reflected portion is reflected back to beamsplitter 122 by flat stationary mirror 114. The analytical beam leaving the interferometer is directed into the sample chamber 124, where it is reflected in collimated form by a flat mirror 126, and then focused at the sample aperture (not shown) by means of a paraboloid 128.

The reference beam is also partially transmitted through beamsplitter 122 to and from the retroreflector 110 and folding mirror 112. In the other arm, the reference beam portion reflected by beamsplitter 122 is reflected back to the beamsplitter by small flat stationary mirror 116. After the split beams return to beamsplitter 122, the recombined reference beam is reflected by a first 45 degree mirror (not shown) and by a second 45 degree mirror 130 toward a reference beam detector 132.

A laser (clock and alignment) beam, shown by dashed line 134, is provided by a source 136. It is reflected by a 45 degree mirror 138 toward two semi-transparent, aligned laser mirrors (beamsplitters) 140 and 142. (The laser beam does not strike reference beam mirror 130, because the latter is in a different horizontal plane.) The laser beam 134 is partially reflected by first small beamsplitter 140 toward primary beamsplitter 122 along path 134c, and is partially transmitted by first small beamsplitter 140 toward second small beamsplitter 142 along path 134d. The path of laser beam 134c which enters the interferometer is partially reflected by primary beamsplitter 122 along path 134e toward the retroreflector 110 and folding mirror 112 in the variable-length arm. This beam retraces path 134e in returning to beamsplitter 122, because of the effect of folding mirror 112. Beamsplitter 122 also transmits part of laser beam 134c along path 134f, causing it to be reflected back by the small stationary flat mirror 116. After the returning laser beams from the interferometer arms recombine at the beamsplitter, their path retraces 134c, and this beam is partially reflected back through a target aperture 144, through which the original beam from source 136 passed. The portion of the returning beam 134c which is transmitted by first small beamsplitter 140 follows path 134g into the sample chamber 124.

The portion of the original laser beam which is transmitted by first small beamsplitter 140 along path 134*d* is reflected by second small beamsplitter 142 along path 134*h* toward the primary beamsplitter 122. There the reflected portion follows path 134*i* to and from retroreflector 110 and folding mirror 112; and the transmitted portion follows path 134*j* to and from the reflecting surface of large stationary flat mirror 114. When these beams recombine at beamsplitter 122, they retrace path 134*h* to the second small beamsplitter 142. There the reflected portion is directed back through target 144; and the transmitted portion follows path 134*k* into the sample chamber 124. The laser beam used to provide clock signals for the spectrometer is reflected by primary beamsplitter 122 along path 134*l*, after 134*i* and 134*j* recombine; it is then reflected by a 45 degree flat mirror 146 toward detector 148. (As explained in Doyle Application Ser. No. 470,936, the position of flat mirror 114, to which flat mirror 116 is secured, is adjustable around a horizontal axis, and separately around a vertical axis, by means of a series of gears and a very low-pitch threaded element operated by a suitable manually adjusted knob.)

The alignment procedure of the FIG. 5 structure is similar to that discussed for FIG. 1. Each arm of the interferometer is separately aligned, using the laser beams. Both small beamsplitters 140 and 142 require careful position adjustments. In each instance, alignment is determined by the retracing of the laser beams through the target aperture 144. This retracing of the laser beam paths establishes the perpendicularity of the laser beam paths to the arm-defining reflectors. The dual laser alignment beams in the FIG. 5 structure have the practical advantages already discussed in checking and aligning the optical elements and accessories in the sample chamber.

From the foregoing description, it will be apparent that the several versions of the apparatus and method disclosed in this application will provide the significant functional benefits summarized in the introductory portion of the specification.

The following claims are intended not only to cover the specific embodiments disclosed, but also the cover the inventive concepts explained herein with the maximum breadth and comprehensiveness permitted by the prior art.

What is claimed is:

1. For use in an interferometer spectrometer having an analytical beam which is divided by a beamsplitter into a variable-length scanning arm and a fixed-length arm, each arm being defined by a reflector, and a laser beam which traverses the interferometer arms to provide clock signals to the spectrometer during scanning, that method of aligning the spectrometer optical elements, in order to provide optimal interferometric accuracy, which comprises:
   directing the clock-signal-providing laser beam through the interferometer for alignment purposes;
   adjusting the interferometer during alignment so that the reflector which defines the first interferometer arm returns the laser beam co-linear or parallel to the entering laser beam; and
   separately adjusting the interferometer during alignment so that the reflector which defines the second interferometer arm returns the laser beam co-linear or parallel to the entering laser beam.

2. The interferometer spectrometer aligning method of claim 1 which comprises:
   providing a target aperture through which the laser beam travels toward and from each interferometer arm when the latter is aligned.

3. The interferometer spectrometer aligning method of claim 1 which comprises:
   first using one of the arm-defining reflectors as a reference surface;
   adjusting the laser-beam direction so that the laser beams going toward and returning from the reference surface are co-linear or parallel; and
   then adjusting the position of the other arm-defining reflector so that the laser beams going toward and returning from it are co-linear or parallel.

4. The interferometer spectrometer aligning method of claim 3 which comprises:
   providing a target aperture through which the laser beam travels toward and from each interferometer arm when the latter is aligned.

5. The interferometer spectrometer method of claim 1 which comprises:
   beamsplitting the laser beam on its path out of the interferometer, thereby causing part of the beam to follow a path toward the target, and the other part of the beam to follow a path toward the sample chamber in the spectrometer.

6. The interferometer spectrometer method of claim 5 which comprises:
   beamsplitting the laser beam on its path toward the interferometer, thereby providing a second laser beam spaced from the first;
   directing the second laser beam also into the interferometer along a path parallel to that of the first laser beam; and
   directing the second laser beam as well as the first laser beam toward the sample chamber in the spectrometer.

7. The interferometer spectrometer method of claim 6 which comprises:
   causing the first and second laser beams to intersect at the sample-illuminating point in the sample chamber.

8. The interferometer spectrometer method of claim 7 wherein the two laser beams are spaced apart by approximately the diameter of the analytical beam in the interferometer.

9. For use in an interferometer spectrometer having an analytical beam which is divided by a beamsplitter into a variable-length scanning arm and a fixed-length arm, each arm being defined by a reflector, and a laser beam which traverses the interferometer arms to provide clock signals to the spectrometer during scanning, that method of using the laser beam to align the spectrometer optical elements, in order to provide optimal interferometric accuracy, which comprises:
   using the reflector which defines the first interferometer arm as the reference surface;
   directing the laser beam through the interferometer to the reference surface and back out of the interferometer;
   providing a target for the returning laser beam so located as to determine perpendicularity of the laser beam to the reference surface;
   adjusting the laser beam direction so that the returning laser beam from the interferometer hits the target; and
   adjusting the position of the reflector which defines the second interferometer arm so that the laser beam reflected from it also hits the target.

10. The interferometer spectrometer aligning method of claim 9 in which the target is an aperture through which the laser beam passes both on its path toward, and on its path returning from, the interferometer.

11. In an interferometer spectrometer having an analytical beam, a fixed-length arm defined by a first reflector, a variable-length scanning arm defined by a second reflector, and a beamsplitter which divides the analytical beam into reflected and transmitted portions in the respective interferometer arms:
   a laser beam generator which provides a beam in the interferometer which creates a clock signal for the spectrometer scanning process;
   a laser beam mirror which reflects the laser beam into the interferometer parallel to the analytical beam;
   means for adjusting one or more interferometer optical elements to cause the laser beam returning from one of the interferometer arms to retrace its path, thereby ensuring its perpendicularity to the arm-defining reflector in that arm; and
   separate means for adjusting one or more interferometer optical elements to cause the laser beam returning from the other interferometer arms to retrace its path, thereby ensuring its perpendicularity to the reflector in that arm.

12. The interferometer spectrometer of claim 11 which comprises:
   a target aperture through which the laser beam passes in both directions as it retraces its path.

13. The interferometer spectrometer of claim 12 wherein:
   the analytical beam passes from the interferometer to the sample chamber in collimated form; and
   the laser beam mirror is semi-transparent, thereby splitting the laser beam returning from the interferometer into a portion directed toward the target and a portion parallel to the analytical beam directed toward the sample chamber.

14. The interferometer spectrometer of claim 13 which comprises:
   a second semi-transparent laser beam mirror which receives a portion of the incoming laser beam transmitted through the first semi-transparent laser beam mirror;
   the portion of the laser beam which reaches the second laser beam mirror being partially reflected toward the interferometer along a path parallel to the laser beam reflected by the first laser beam mirror; and
   means for adjusting the second laser beam mirror to insure the perpendicularity of its reflected beam to the arm-defining reflectors, and thus insure the parallelism of the two laser beams.

15. The interferometer spectrometer of claim 14 wherein:
   the second semi-transparent laser beam mirror splits the laser beam returning to it from the interferometer into a portion directed toward the target and a portion parallel to the analytical beam directed toward the sample chamber.

16. The interferometer spectrometer of claim 11 in which the laser beam mirror is semi-transparent, and which also comprises:
   a second laser beam mirror which receives the beam transmitted by the first laser beam mirror and reflects a second laser beam into the interferometer parallel to the first laser beam.

17. The interferometer spectrometer of claim 16 in which a sample aperture in the sample chamber is the focal point of the analytical beam and the intersection point of the two laser beams.

18. In an interferometer spectrometer having an analytical beam, a fixed-length arm defined by a first reflector, a variable-length scanning arm defined by a second reflector, a beamsplitter which divides the analytical beam into reflected and transmitted portions in the respective interferometer arms, and a sample chamber having a focal point aperture at which the sample is illuminated:
   a laser beam generator which provides a beam in the interferometer in order to create a clock signal for the spectrometer scanning process; and
   means for directing a laser beam originated at the generator into the sample chamber, such laser beam passing through the focal point aperture when the spectrometer is in alignment.

19. The interferometer spectrometer of claim 18 which also comprises:
   means for directing a second laser beam originated at the generator into the sample chamber spaced from the first laser beam therein, the second such laser beam intersecting the first such laser beam at the focal point aperture when the spectrometer is in alignment.

20. The interferometer spectrometer of claim 19 wherein each laser beam directing means is a beamsplitter other than the beamsplitter which divides the analytical beam.

* * * * *